June 22, 1954 W. RABKIN ET AL 2,681,842
MULTIPLE MAGAZINE TYPE ARTICLE VENDING APPARATUS
Filed June 24, 1950 9 Sheets-Sheet 1

INVENTORS.
William Rabkin
and Leonard Baron
BY
Edwin Levisohn &
Harry Cohen
Attorneys.

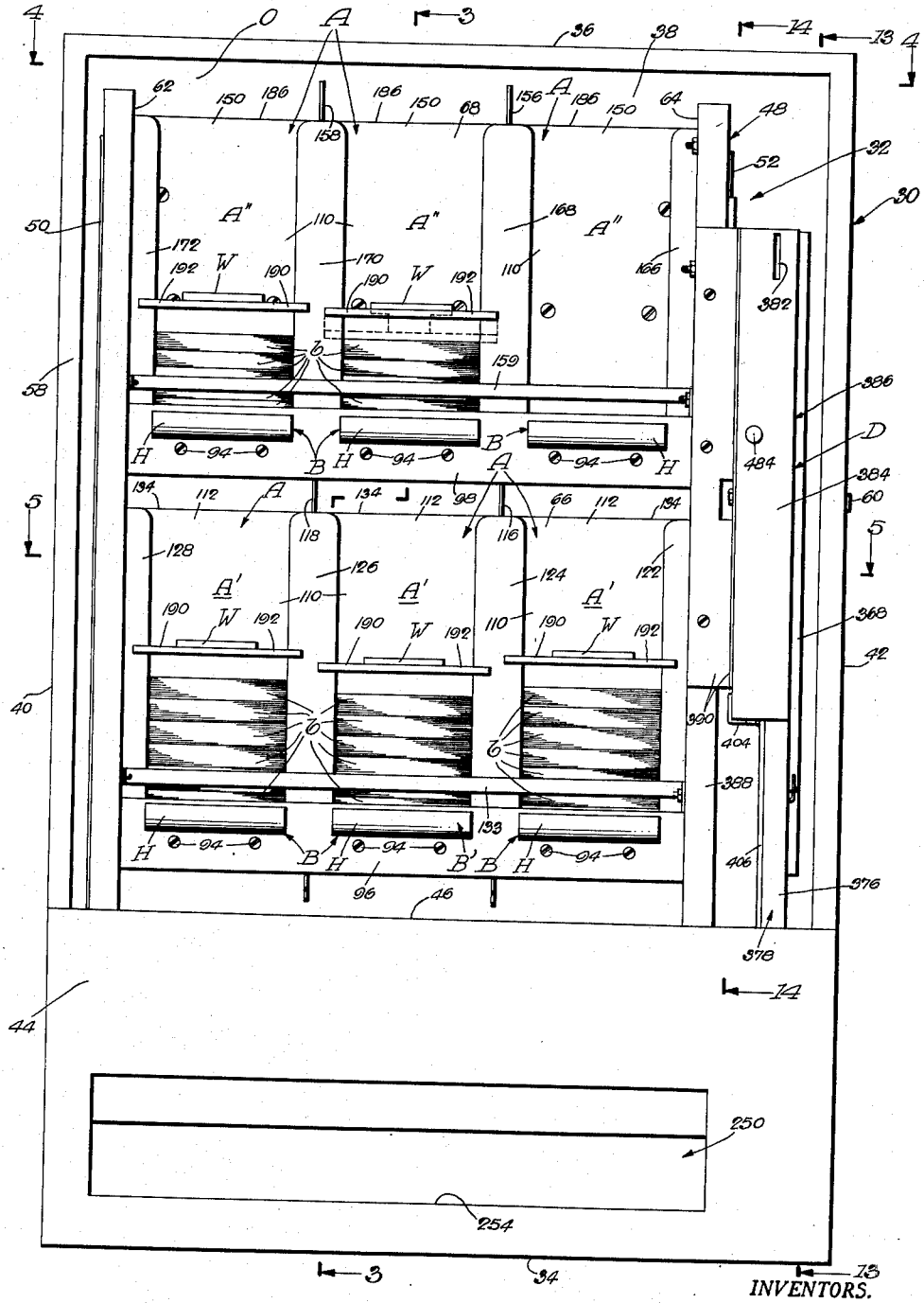

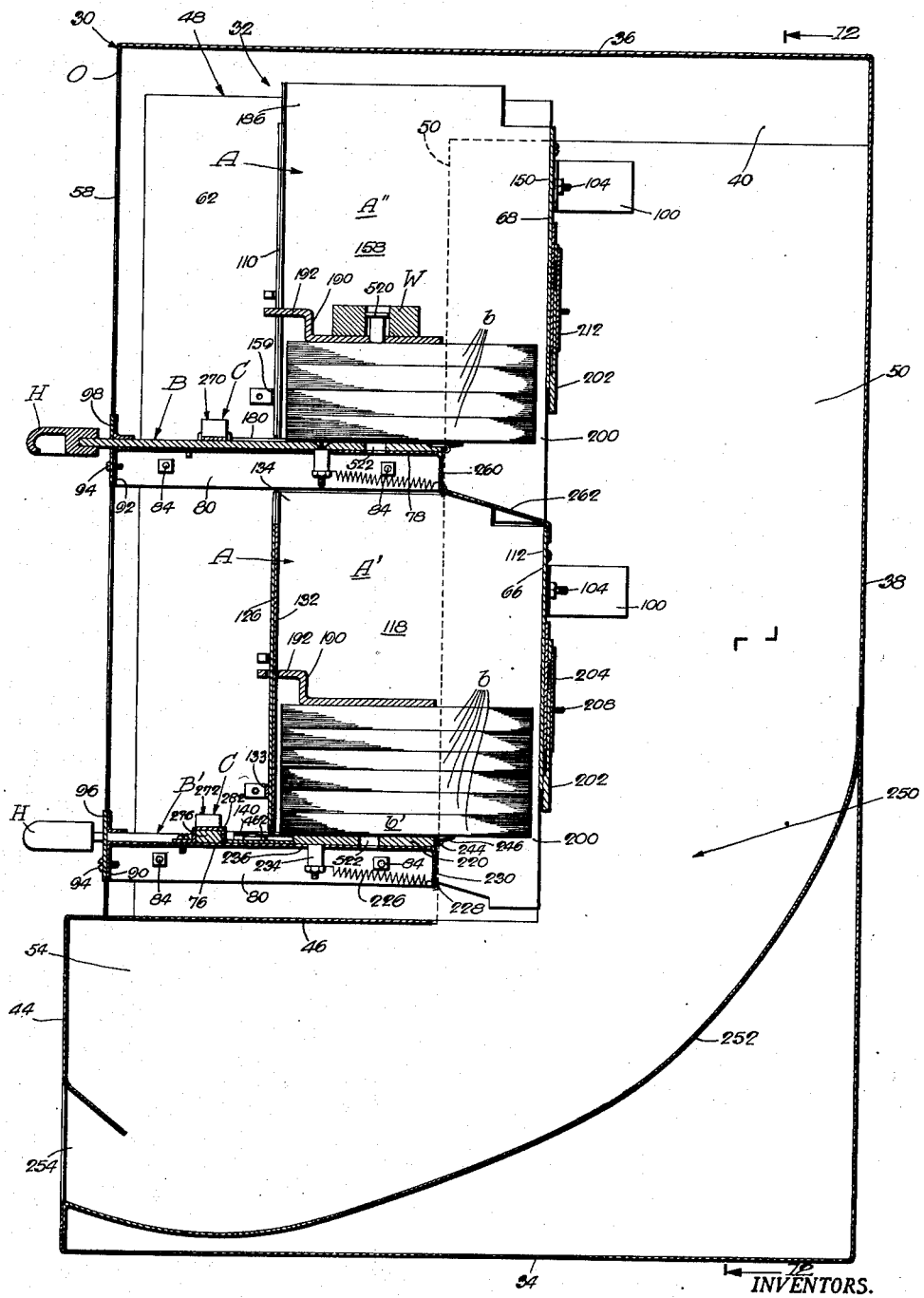

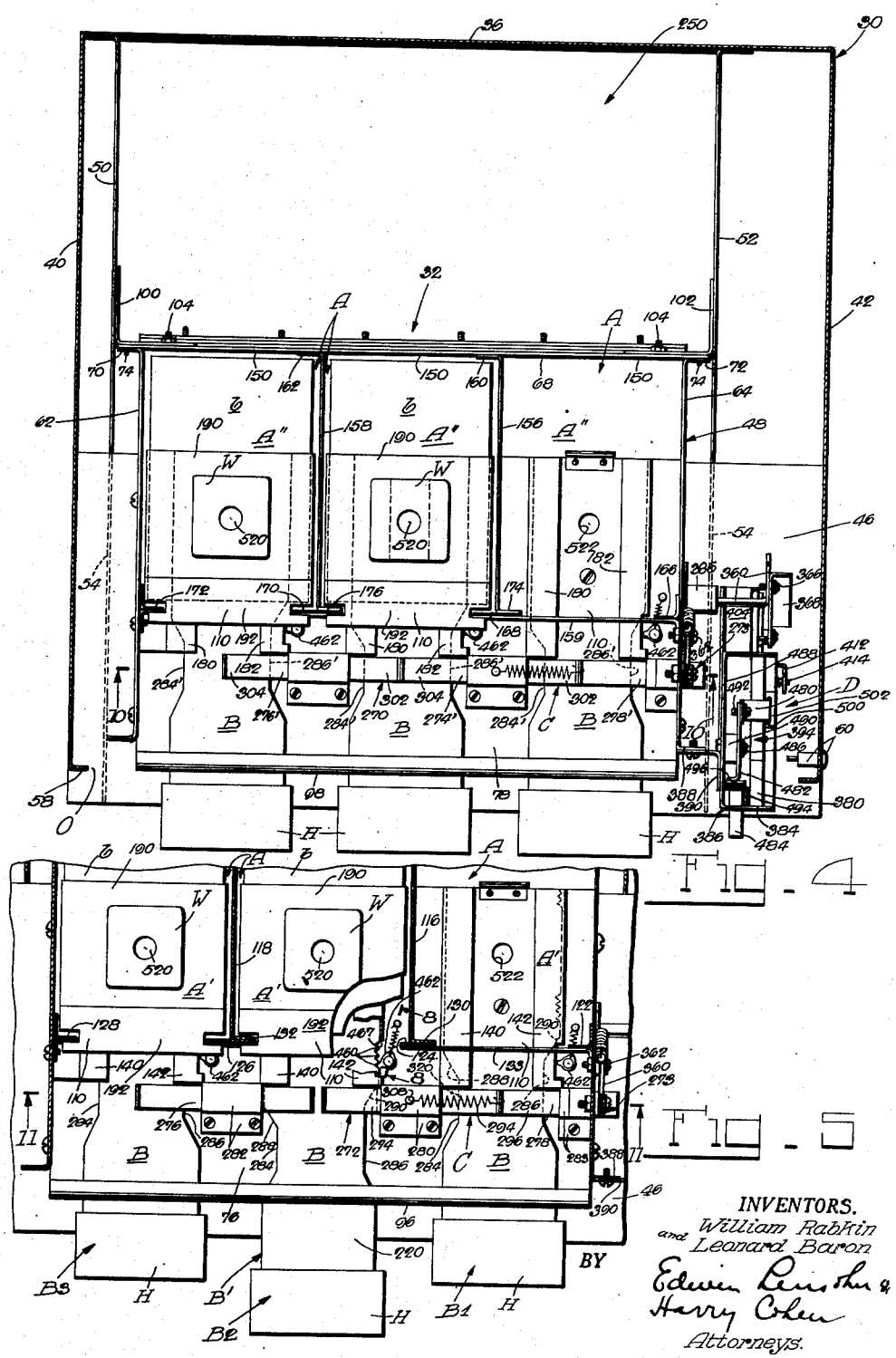

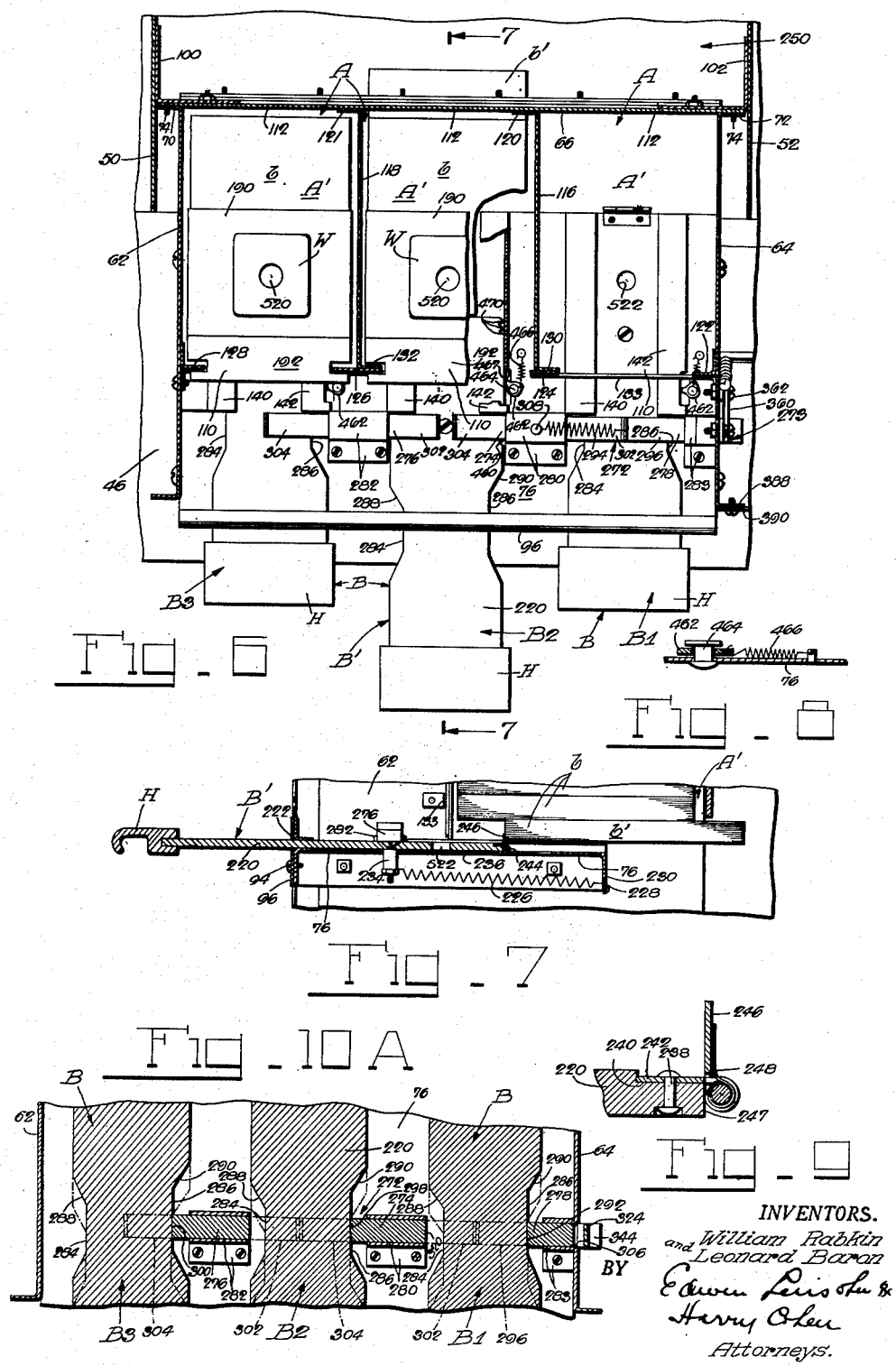

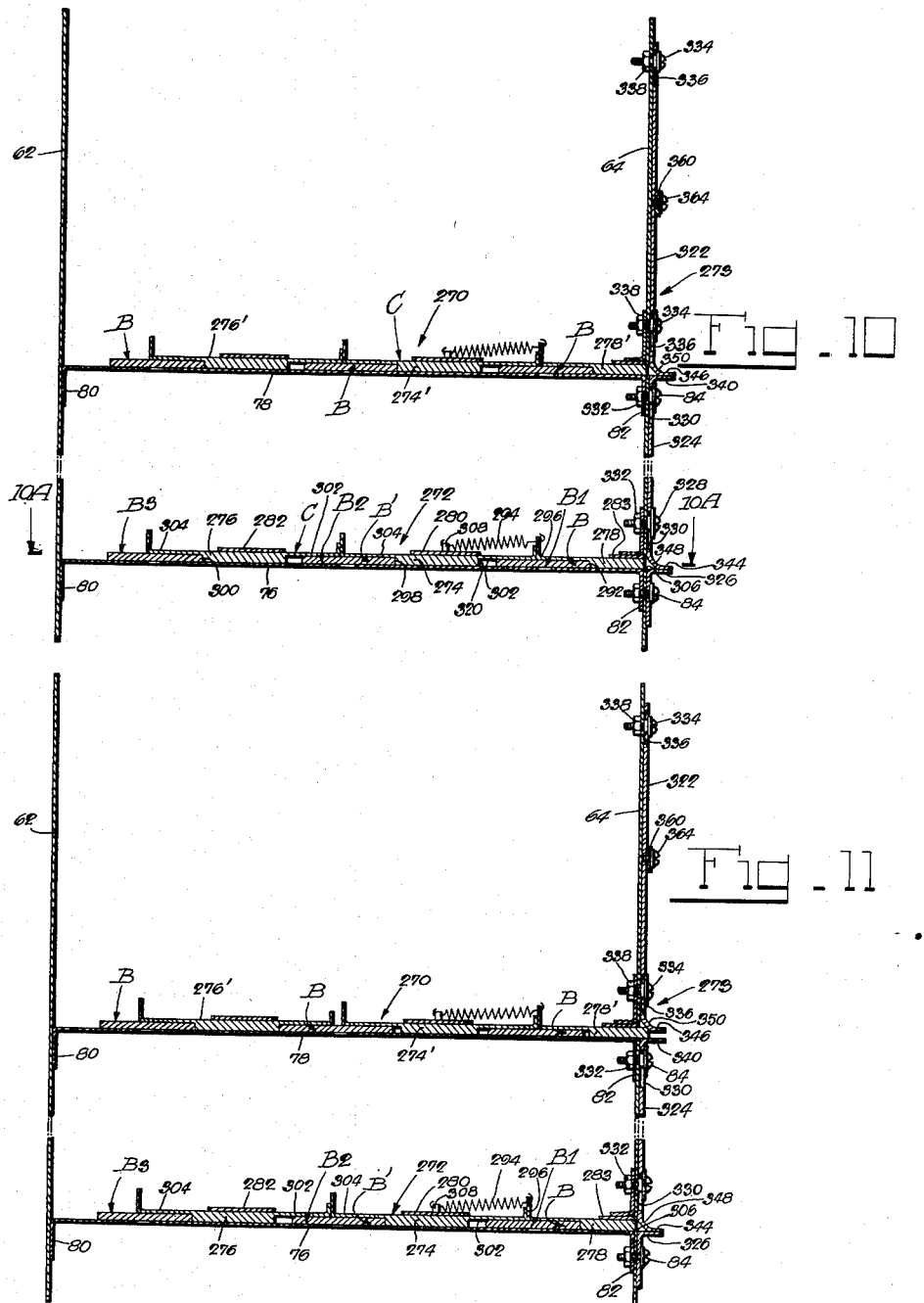

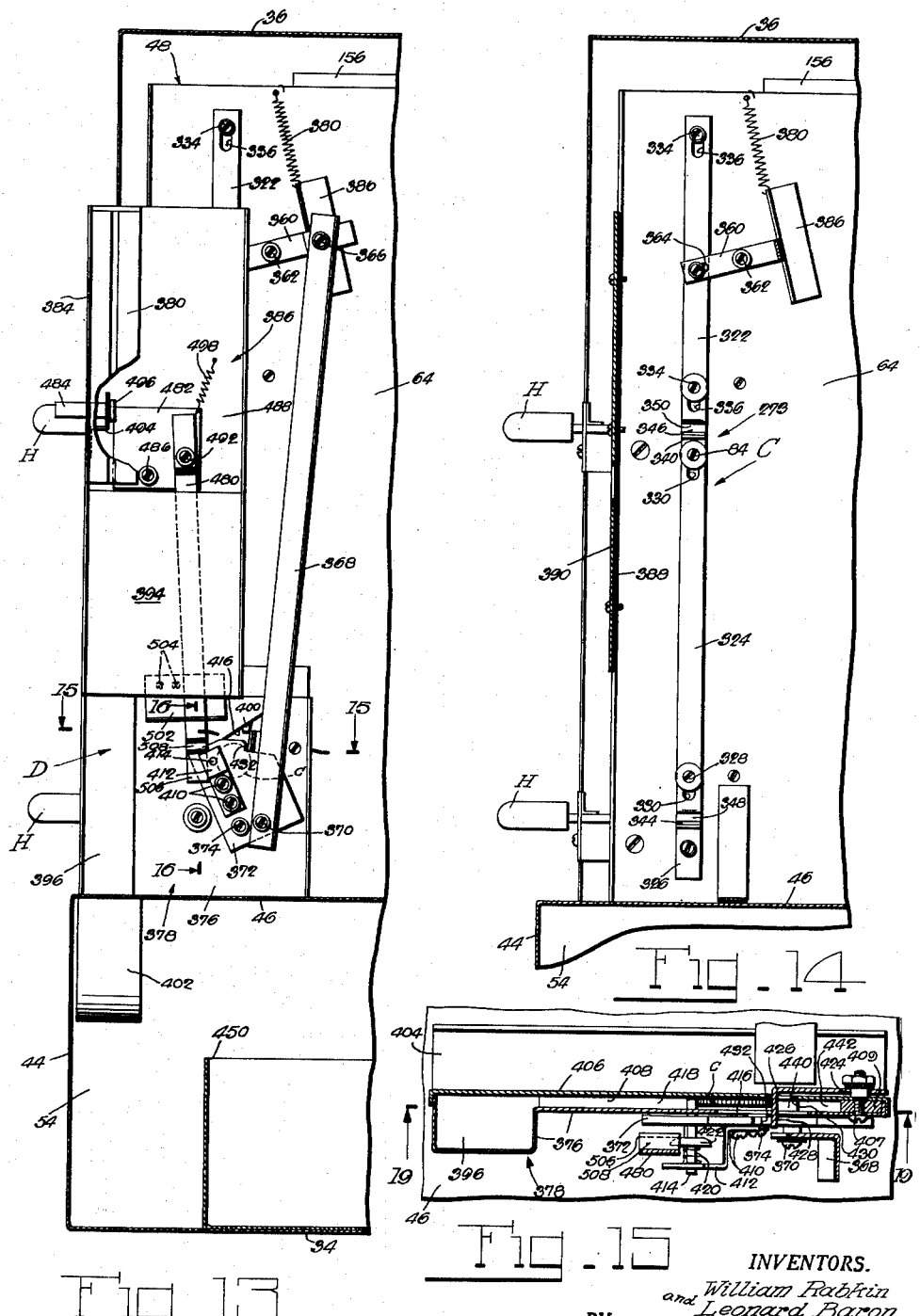

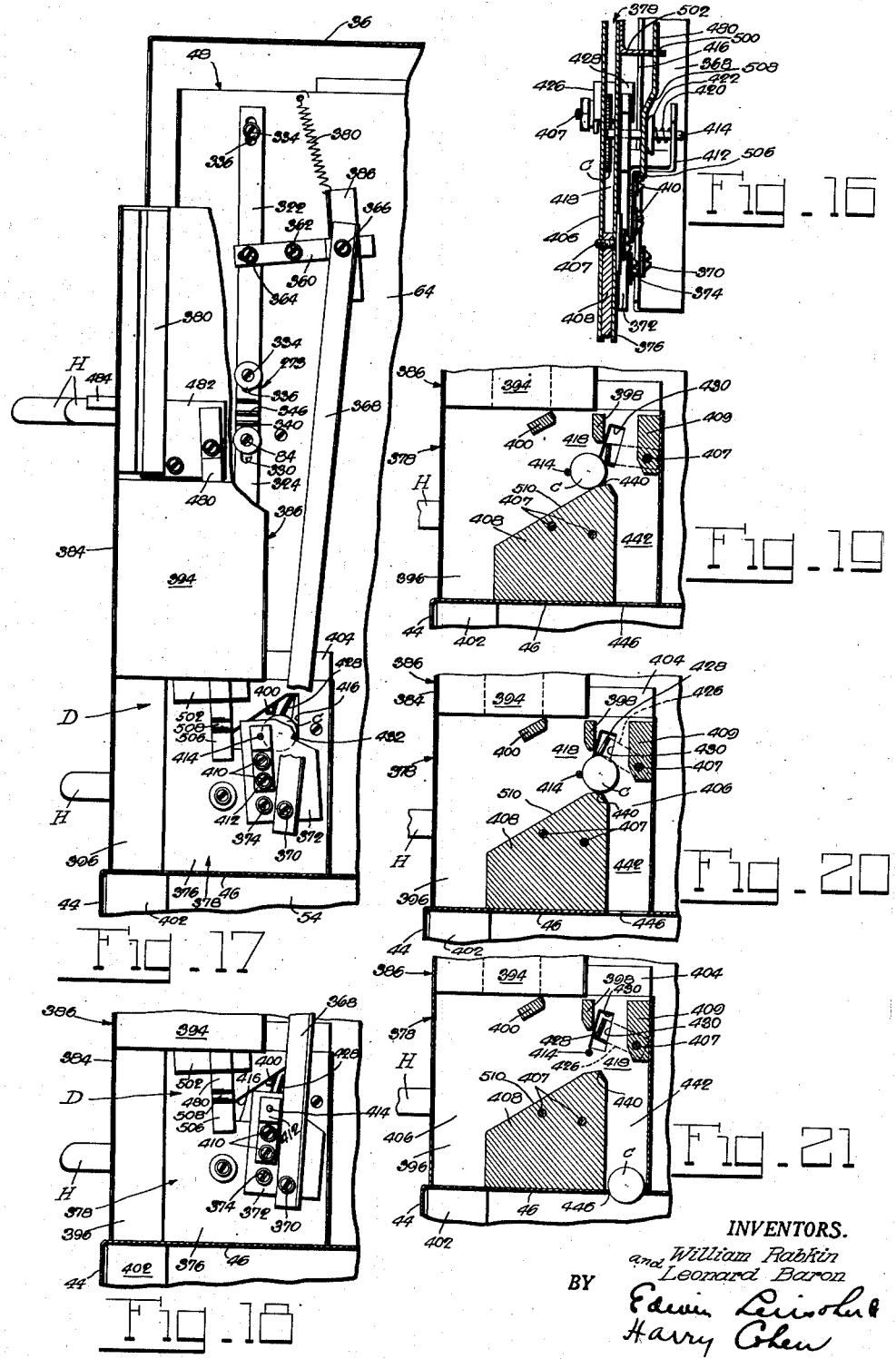

Patented June 22, 1954

2,681,842

UNITED STATES PATENT OFFICE 2,681,842

MULTIPLE MAGAZINE TYPE ARTICLE VENDING APPARATUS

William Rabkin and Leonard Baron, New York, N. Y., assignors to International Mutoscope Corporation, Long Island City, N. Y., a corporation Application June 24, 1950, Serial No. 170,084

3 Claims. (Cl. 312—35)

This invention relates to apparatus for vending articles, such as books or the like.

It is an object of the present invention to provide vending apparatus of this type which is equipped with a plurality of upright magazines arranged side-by-side in several superposed rows, and which has provisions for the release of the lowermost article in any customer-selected magazine for removal therefrom on depositing a coin or coins in a single coin chute which is common to all magazines.

It is another object of the present invention to equip each magazine in the apparatus with a separate article-ejector slide for manipulation by a customer, and to provide the apparatus with a lock mechanism which, while normally arresting all slides against manipulation, will, on depositing a coin or coins in the apparatus, release all slides for selective manipulation of any one slide and re-arrest all remaining slides against manipulation on actual manipulation of a selected slide by a customer.

It is another object of the present invention to incorporate the article-ejector slides in the lock mechanism therefor and operate the latter through manipulation of the former, thereby to simplify the construction and operation of the lock mechanism.

It is another object of the present invention further to simplify the construction of the lock mechanism by forming the same from a minimum number of simple parts which for their correct cooperation need not be formed or machined overly accurately, so that the lock mechanism may quickly and satisfactorily be assembled from stock parts, or any part of the lock mechanism may, if necessary, be readily replaced with a stock part, without requiring adjustment of any kind.

It is another object of the present invention to provide in the lock mechanism for the article-ejector slides an operational lag which will permit restoration to inoperative condition of any slide that has been partially manipulated within predetermined limits, and permit manipulation of another slide instead, thereby affording a customer the opportunity to change his or her selection even after partial manipulation of a slide.

It is another object of the present invention to make provisions in the apparatus for the selective return to a customer of a deposited coin or coins prior to manipulation of a slide or even after partial manipulation within the aforementioned limits of a selected slide, thereby affording the customer the opportunity to cancel the intended purchase of an article for any reason whatever, and get back his or her money after its deposition in the apparatus.

The above and other objects, features and advantages of the present invention will be more fully understood from the following description considered in connection with the accompanying illustrative drawings.

In the drawings:

Fig. 2 is a front elevational view of the enclosed apparatus, drawn to a larger scale than in Fig. 1, with the front door or panel of the cabinet removed;

Fig. 3 is a vertical section through the enclosed apparatus as taken on the line 3—3 of Fig. 2;

Fig. 4 is a horizontal section through the enclosed apparatus as taken on the line 4—4 of Fig. 2;

Fig. 5 is a fragmentary section taken substantially on the line 5—5 of Fig. 2;

Fig. 6 is a fragmentary section similar to Fig. 5, showing certain parts of the apparatus in a different operating position;

Fig. 7 is a fragmentary section taken on the line 7—7 of Fig. 6;

Fig. 8 is an enlarged, fragmentary section taken on the line 8—8 of Fig. 5;

Fig. 9 is an enlarged part of the section shown in Fig. 7;

Fig. 10 is a section taken on the line 10—10 of Fig. 4;

Fig. 10A is a fragmentary section taken on the line 10A—10A of Fig. 10;

Fig. 11 is a section taken on the line 11—11 of Fig. 5;

Figure 1:
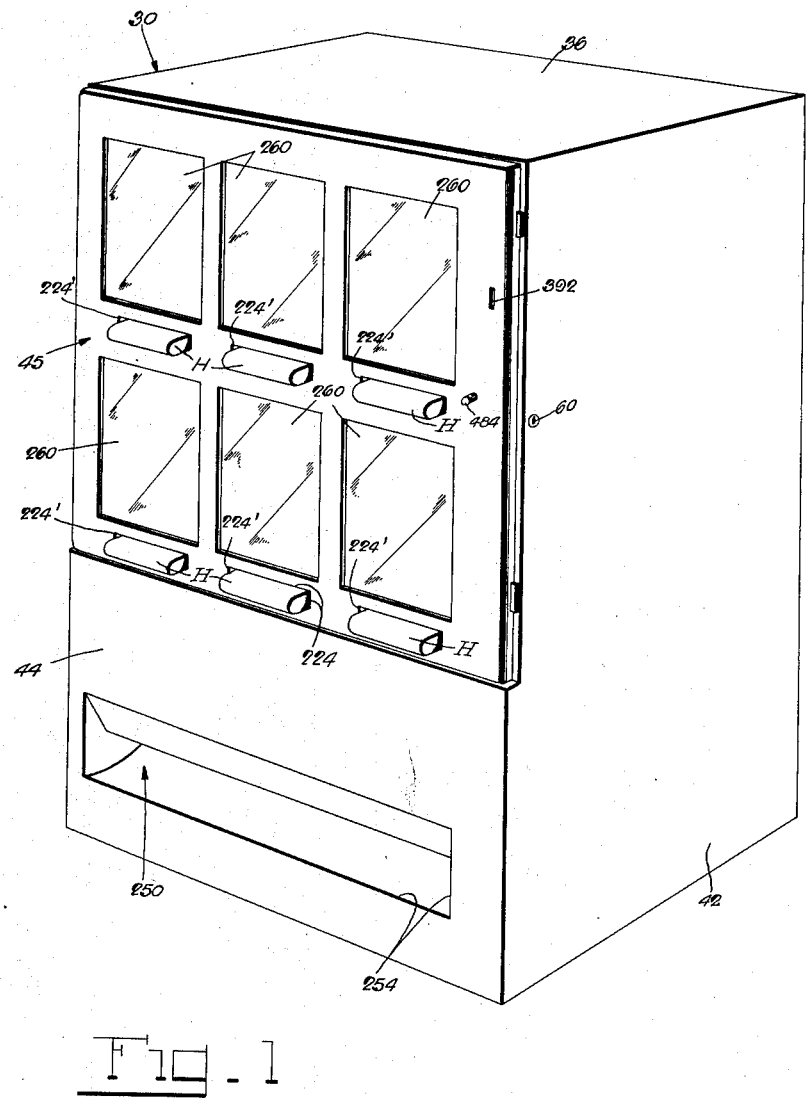
Fig. 1 is a perspective view of a cabinet-enclosed apparatus embodying the present invention.

Figs. 13 and 14 are fragmentary sections taken substantially on the lines 13—13 and 14—14, respectively, of Fig. 2;

Figs. 15 and 16 are enlarged, fragmentary sections taken substantially on the lines 15—15 and 16—16, respectively, of Fig. 13;

Figs. 17 and 18 are fragmentary sections similar to Fig. 13, showing certain mechanism of the apparatus in different operating positions, respectively;

Fig. 19 is a reduced, fragmentary section taken substantially on the line 19—19 of Fig. 15; and Figs. 20 and 21 are fragmentary sections similar to Fig. 19, showing a coin in different stages, respectively, of its deposition in the apparatus.

Referring to the drawings, and more particularly to Figs. 1 to 4 and 12 thereof, the reference numeral 30 designates a cabinet in which a vending apparatus 32 is enclosed. The cabinet 30, which may be of any desired design and construction, comprises in this instance bottom, top, rear and side walls 34, 36, 38, 40 and 42, respectively, and a front wall 44 which extends upwardly from the bottom wall 34 to the extent shown in Figs. 2 and 3 in order to leave in the front of the cabinet an opening O for access to the enclosed apparatus 32. The opening O in the cabinet 30 is normally closed by a removable door or front panel 45. The front wall 44 of the cabinet 30 continues inwardly as at 46 (Figs. 3, 4 and 12) to serve as a platform on which to support the frame 48 of the apparatus. The cabinet 30 further comprises two spaced vertical partitions 50 and 52 (Figs. 2, 4 and 12) which are generally L-shaped (Fig. 3) so that the lower legs 54 thereof may extend beneath and support the platform 46 (Fig. 4). The door or front panel 45 may removably be mounted on the cabinet 30 by means of lug-type hinges (not shown) on the former which may project behind the front flange 58 of the cabinet, and by the further provision of a key lock 60 on the side wall 42 of the cabinet.

Figure 12:
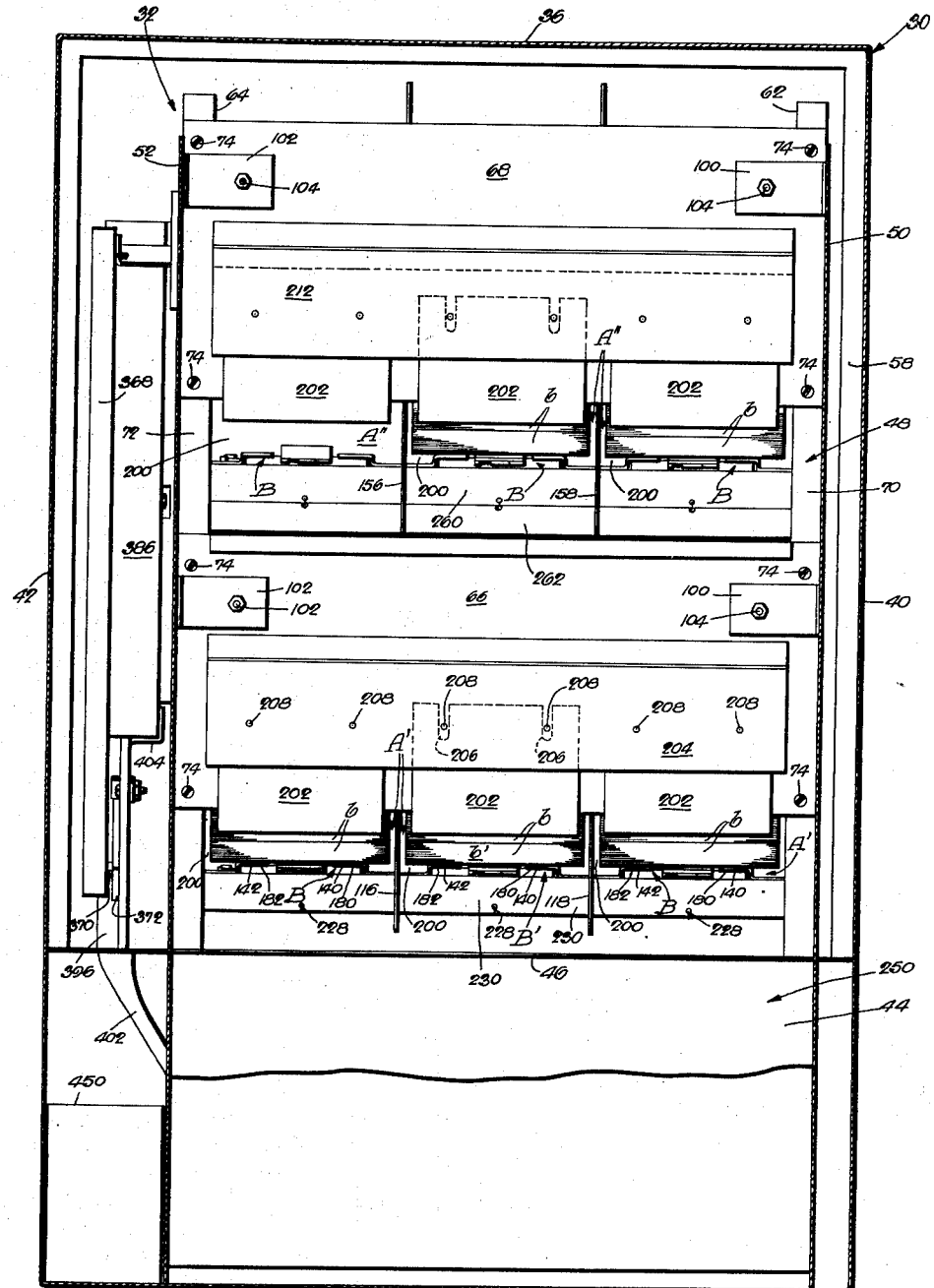
Fig. 12 is a vertical section through the enclosed apparatus as taken on the line 12—12 of Fig. 3.

The frame 48 of the apparatus comprises, in the present instance, opposite side members or walls 62 and 64 (Figs. 2, 3 and 4) spaced wall members 66 and 68 which extend across the side walls 62 and 64 and are secured to outwardly turned rear flanges 70 and 72 of the latter in any suitable manner, as by screws 74, for instance (see also Fig. 12). The frame 48 further comprises spaced horizontal partitions or platforms 76 and 78 (Figs. 3, 4 and 10) each of which has opposite depending flanges 80 and 82 which are secured to the adjacent side walls 62 and 64, respectively, in any suitable manner, as by screws 84, for instance. The platforms 76 and 78 are at the front thereof provided with depending flanges 90 and 92, respectively, to which are secured by screws 94, for instance, guide plates 96 and 98, respectively (Figs. 2 and 3). The frame 48, which is a self-contained unit, may be stood with its opposite side walls 62 and 64 on the platform 46 in the cabinet (Figs. 2 and 3). The frame 48 may conveniently be secured in place in the cabinet 30 by means of angles 100 and 102 which are secured at 104 to the wall members 66 and 68 of the frame 48 and welded or otherwise secured to the adjacent upright partitions 50 and 52, respectively, in the cabinet 30 (Figs. 3, 4 and 12).

Provided in, or carried by, the frame 48 are different devices and operating mechanisms of the apparatus. These are a plurality of magazines A for the reception of articles to be vended, such as books b, for instance (Figs. 2, 3, 4 and 5); book-ejector slides B for the magazines A, respectively (Figs. 2, 3, 4, 5 and 7); lock provisions C for the slides B (Figs. 3, 4, 5, 10 and 14); and a coin-control mechanism D (Figs. 2, 4, 13, 17 and 18).

Magazines A

Referring to Figs. 2 to 6, inclusive, there are shown a plurality of magazines A which, in the present instance, are arranged side-by-side in each of two horizontal rows above the platforms 76 and 78, respectively, of the frame 48. Further in the present instance, there are provided in each horizontal row three adjacent magazines which are open at the front as at 110 for the exposure thereat of the books b contained therein. Each magazine A' in the lower row has three upright walls (Figs. 2, 3 and 6) of which the rear walls 112 of these lower magazines are formed by the wall member 66 of the frame 48, while the outer walls of the lower endmost magazines A' are formed by the opposite side walls 62 and 64, respectively, of the frame 48, and the remaining walls of the lower magazines A' are formed by spaced upright partitions 116 and 118, respectively, in the frame 48 above the platform 76 thereof. The partitions 116 and 118 are at the rear thereof provided with lateral flanges 120 and 121, respectively, which are suitably secured, as by welding, for instance, to the wall member 66 of the frame 48 (Fig. 6). The lower magazines A' are at their open fronts provided with inward flanges 122, 124, 126 and 128, of which the opposite end flanges 122 and 128 are conveniently formed by angles which are welded or otherwise secured to the adjacent side walls 64 and 62, respectively, of the frame 48, while the intermediate flanges 124 and 126 are formed by sheet metal strips which may be welded or otherwise secured to lateral front flanges 130 and 132 on the partitions 116 and 118, respectively (Figs. 3, 5 and 6). The flanges 122 to 128 serve for the retention of the stacked books b in the lower magazines, as well as for another purpose described hereinafter. The partitions 116 and 118 between the adjacent lower magazines A' are further secured in their spaced relation at the front thereof by a tie strip 133 which is welded or otherwise secured to the flanges 124 and 126 and to the side walls 62 and 64 of the frame 48. The lower magazines A' are open at 134 at their respective tops (Figs. 2 and 3) through which books b may be inserted after removal of the front panel 45 on the cabinet 30. Each lower magazine is provided within its confines with opposite guide channels 140 and 142 (Figs. 3, 5, and 12) on which the stacked books b in the magazine rest, and which serve for the guidance of the associated ejector slide B. The guide channels 140 and 142 in each lower magazine A' may be welded or otherwise secured to the platform 76.

The magazines A'' of the upper row are formed similarly as the magazines A' of the lower row. Thus, the rear walls 150 of the upper magazines A'' are formed by the wall member 68 of the frame 48 (Figs. 3 and 4), while the outer walls of the upper endmost magazines A'' are formed by the side walls 62 and 64, respectively, of the frame 48, and the remaining walls of the magazines A'' are formed by spaced upright partitions 156 and 158, respectively, which are suitably secured at 160 and 162, respectively, to the wall member 68 of the frame 48. The upper magazines A' are provided at their open fronts with inward flanges 166, 168, 170 and 172 (Figs. 2 and 4), of which the opposite end flanges 166 and 172 are conveniently formed by angles which are suitably secured, as by welding, to the adjacent side walls 64 and 62, respectively, of the frame 48, while the intermediate flanges 168 and 170 are provided by strips which are suitably secured, as by welding, to front flanges 174 and 176 of the partitions 156 and 158, respectively. The partitions 156 and 158 between the adjacent upper magazines A'' are further secured in their spaced relation at the front thereof by a tie strip 159 which is welded or otherwise secured to the flanges 174 and 176 and to the side walls 62 and 64 of the frame 48. Each upper magazine A'' is provided within its confines with opposite guide channels 180 and 182 (Figs. 3, 4 and 12) on which the stacked books *b* in the magazine rest, and which serve for the guidance of the associated ejector slide B. The guide channels 180 and 182 in each upper magazine A" may be welded or otherwise secured to the platform 78. The upper magazines A' are open at 186 at their respective tops (Figs. 2 and 3) through which books *b* may be inserted after removal of the front panel 45 of the cabinet 30.

The stacked books *b* in each magazine A are preferably weighted down by a follower 190 (Figs. 2, 3, 4 and 5) which carries a weight W and has an offset slotted forward end 192 that is received and guided by the adjacent opposite front flanges of the magazine in the manner best shown in Figs. 4 and 5. Thus, the follower 190 in each magazine A is guided for descent with the diminishing supply of stacked books therein, and may, for the insertion of additional books in the magazine, be removed at the top of the latter.

As best shown in Figs. 3 and 12, each magazine A has in its rear an opening 200 which permits the edgewise removal of only the lowermost book *b'* rearwardly from the magazine. In order to adapt the magazines A in the instant apparatus for the storage and discharge of books of varying thickness, each magazine A is provided at the rear thereof with a vertically adjustable gauge or stop plate 202 (Figs. 3 and 12). More particularly, the gauges 202 for the lower magazines A' are interposed between the wall member 66 of the frame 48 and a spaced plate 204 thereon, and each of these gauges is provided with top notches 206 (Fig. 12) to clear screws 208, respectively, by means of which the gauge is in its vertically adjusted position firmly clamped between the wall member 66 and the plate 204 (Fig. 3). The gauges 202 on the upper magazines A" are similarly adjustably mounted on the wall member 68 of the frame 48 and a spaced plate 212 thereon. Thus, the gauges or stop plates 202 on the respective magazines A are so vertically adjusted that they permit the edgewise rearward ejection of the lowermost books only from these magazines, as will be readily understood.

*Book-ejector slides B*

Since the ejector slides B for the various magazines A are identical in every respect, the construction and operation of only one of them, namely the slide B', will now be described in detail, with particular reference to Figs. 3, 5, 6 and 7. Thus, the slide B' is formed by a plate 220 which is slidable in the guide channels 140 and 142 of the associated magazine, and projects through an opening 222 in the guide plate 96 on the frame 48. The plate 220 carries at its forward end a handle H which in the innermost or home position of the slide B' (Fig. 3) projects forwardly through an opening 224 in the front panel 45 of the cabinet 30 to the extent indicated in Fig. 1, so that a customer may conveniently grip the handle H for manipulation of the slide B'. The plate 220 is normally urged into its home position (Fig. 3) by a spring 226 of which one end is anchored at 228 to a depending flange 230 at the rear of the platform 76, and the other end is anchored to a stud 234 which depends from the plate 220 and extends through an elongated slot 236 in the platform 76 (Fig. 7). The stud 234 on the plate 220 is normally urged by the spring 226 into engagement with the right-hand end of the slot 236 (Fig. 3), thus preventing any further inward movement of the slide B' beyond the home position shown in Fig. 3. Suitably secured, as by a rivet 238, in a recess 240 in the top surface of the plate 220, is one leaf 242 of a hinge 244, of which the other turnable leaf 246 is normally urged by a suitably applied torsion spring 248 into the vertical disposition shown in Figs. 7 and 9. The leaf 246 is by the adjacent end surface 247 of the plate 220 stopped from turning beyond its erect disposition in counter-clockwise direction as viewed in Fig. 9, but is permitted to turn in the opposite direction against the tendency of the spring 248 to turn it to its erect disposition.

On drawing the slide B' at its handle H outwardly to its fully advanced position, the hinge 244 thereon will be in front of the lowermost book *b'* in the associated magazine, in which position the leaf 246 of the hinge 244 is spring-urged into its upright disposition. Thus, the upright or erect leaf 246 of the hinge 244 will, on the subsequent inward push of the slide B' by the customer, engage and push the lowermost book *b'* from the associated magazine in the manner shown in Fig. 7. When the slide B' reaches its home position (Fig. 3), the lowermost book *b'* ejected thereby clears the rear end of the platform 76 and is then free to drop into a chute 250 in the cabinet in which it will gravitate to a discharge opening 254 in the front wall 44 of the cabinet (Figs. 1, 2 and 3). The chute 250 is formed by the rear wall 38 of the cabinet 30, the upright partitions 50 and 52 therein (Figs. 3 and 4), and a curved baffle 252 which extends between the partitions 50 and 52 and guides the ejected book toward the discharge opening 254 in the cabinet through which the customer may reach for the book.

As previously mentioned, the leaf 246 of the hinge 244 is, by the adjacent end surface 247 of the plate 220, prevented from turning counter-clockwise beyond the vertical disposition shown in Fig. 9, so that after the ejection of the lowermost book *b'* from the magazine the next lowermost book of the stack will, on its descent onto the adjacent guide channels 140 and 142, turn the leaf 246 clockwise as viewed in Fig. 9 into the out-of-the-way disposition shown in Fig. 3. If the lowermost descending book should, however, come to rest on the top edge of the leaf 246 in its erect disposition, rather than immediately turn the latter out of the way, the leaf 246 will without fail be turned into its out-of-the-way disposition (Fig. 3) on the following withdrawal of the slide B' from its home position, as will be readily understood. The other slides B for the remaining magazines perform in exactly the same manner as the described slide B', and their handles H project for their manipulation to the front of the closed cabinet 30 through openings 224', respectively, in the front panel 45 thereof. While an ejected book *b* from any of the lower magazines A' will without fail drop into the chute 250 on clearing the rear end of the platform 76, as appears clearly from Figs. 3 and 7, a book ejected from any one of the upper magazines A" might get caught on top of the magazine therebelow and especially on the top edge of the lower wall section 66 of the frame 48. To prevent this, the depending flange 260 at the rear of the platform 78 is throughout the extent of all upper magazines A" extended at 262 in the rearwardly and downwardly slanting manner shown in Fig. 3.

The front panel 45 of the cabinet 30 is, in the present instance, provided with a plurality of preferably glass-covered windows 260 behind which to exhibit the front covers, or other matter descriptive of, the books stored in the respective magazines with which these windows are in alignment, thereby affording a prospective purchaser the opportunity to make his or her selection.

Lock provisions C

Provisions are made in the instant apparatus for normally locking all ejector slides B in their respective home, or substantially home positions (Fig. 3), except when a coin or coins have been deposited in the apparatus for the purchase of a book. More particularly, these provisions will, on deposition of a coin in the apparatus, release all ejector slides B for selective manipulation of any one slide, and rearrest all remaining slides against movement from their home positions on withdrawing a selected slide. These provisions comprise lock mechanisms 270 and 272 for the slides B of the upper and lower magazines A" and A', respectively, and a locking device 273 which cooperates with the lock mechanisms 270 and 272 (Figs. 3, 4, 5 and 10). Since the lock mechanisms 270 and 272 for the slides of the respective upper and lower magazine rows are identical in construction and performance, only one of them, namely the lock mechanism 272 for the slides of the lower magazine row, will now be described in detail. Thus, the lock mechanism 272 comprises, in the present instance, lock members 274 and 276 which are in the form of spacers between the slides B1 and B2 and between the slides B2 and B3, respectively (Figs. 5, 10 and 10A), and an end locking member 278 which is arranged at one side of the slide B1. The locking members 274 and 276, which are identical, are guided for longitudinal movement on the platform 76 in channels 280 and 282, respectively, and the locking member 278 is guided for longitudinal movement on the platform 76 in a channel 283. The guide channels 280, 282 and 283 are suitably mounted on the platform 76. Each of the slides B1 to B3 is provided with opposite side notches 284 and 286 of which the edges 288 and 290, respectively, form cams that are offset longitudinally of each slide as clearly shown in Fig. 10A. In the home position of the slides B1 to B3 of the lower magazines, their respective side notches 286 are normally interlocked with the locking members 278, 274 and 276, respectively, in the manner indicated in Fig. 10A. To this end, the locking member 278 is with its shoulder 292 urged by a tension spring 294 into interlocking engagement with the notch 286 in the adjacent slide B1 (Figs. 10 and 10A), while an L-shaped extension 296 on said locking member 278 forces shoulders 298 and 300 on the locking members 274 and 276, respectively, into interlocking engagement with the notches 286 in the adjacent slides B2 and B3, respectively, through intermediation of L-shaped extensions 302 and 304 on each of the locking members 274 and 276 (Figs. 5 and 10). It will be noted especially in Fig. 10A that the withdrawal of either one of the slides B1 to B3 would require a shift of the locking member 278 to the right as viewed in Fig. 10A through a slot 306 in the side wall 64 of the frame 48, but such shift of the member 278 is, in a manner hereinafter described, prevented by the locking device 273 so long as there is no coin deposited in the apparatus. Thus, in the absence of a deposited coin in the apparatus, the slides B1 to B3, while in the present instance withdrawable from their full-line home positions into the dot-and-dash line positions in Fig. 10A, are nevertheless effectively locked against full withdrawal for the ejection of books, as will be readily understood. The spring 294 may conveniently be anchored with one end on the extension 296 of the locking member 278, and with its other end on a stud 308 on the guide channel 280.

Assuming now that a coin has been deposited in the apparatus for the purchase of a book, the locking device 273 will then in a manner described hereinafter, permit the locking member 278 to be shifted to the right from the lock position shown in Figs. 10 and 10A. The purchaser, having selected a book from the middle lower magazine A', for instance, may then withdraw the slide B2 at its handle H, whereby the cam edge 290 of the latter slide will shift the locking members 274 and 278 to the right as viewed in Fig. 10 into the position shown in Fig. 5, in which the locking member 274 clears the adjacent notch 286 in the slide B2 and permits full withdrawal of the latter. In thus withdrawing the slide B2, its notch 284 will move out of alignment with the adjacent endmost locking member 276, whereby the latter remains arrested in its lock position (Fig. 5) by the slide B2 so that withdrawal of the slide B3 is rendered impossible while the slide B2 is being withdrawn. The other slide B1 is, during the described withdrawal of the slide B2, also locked against withdrawal in consequence of the shift of the locking member 274 into the position shown in Fig. 5, in which the shoulder 320 of the latter member is in interlocked relation with the notch 284 in the slide B1. It will now be understood from the foregoing and from an inspection of Fig. 10A, that withdrawal by a customer of the slide B1, for instance, after preceding deposition of a coin in the apparatus, would lock the other slides B2 and B3, in their respective home positions, since the locking members 274 and 276 would be arrested in their respective lock positions by the slide B1 as soon as its notch 284 would, in the course of the withdrawal of the said slide B1, move out of alignment with the locking member 274. Likewise, the slides B2 and B1 would be locked against withdrawal from their respective home positions if a customer should, after deposition of a coin in the apparatus, select and fully withdraw the slide B3, in which case the cam edge 290 on the latter slide would shift the locking members 276 and 274 into interlocking relation with the notches 284 in the slides B2 and B1, respectively, as will be readily understood.

While the instant apparatus is shown as having three magazines in each row, it stands to reason that a different number of magazines may be provided in each row. However, regardless of the number of magazines in each row, the instant lock mechanism 272 is fully effective so long as a locking member, such as member 274 or 276, is interposed between each pair of consecutive magazines, as will be readily understood.

The lock mechanism 270 for the slides B of the upper magazines A" is, as previously mentioned, identical in every respect with the described lock mechanism 272. Thus, there are provided for the slides B of the upper magazines A" locking members 274', 276' and 278' (Figs. 4 and 10), while each of the upper slides B is provided with opposite side notches 284' and 286' for cooperation with the adjacent locking members.

Referring now to Figs. 10 and 14, the locking device 273 comprises bars 322 and 324 for the lock mechanisms 270 and 272, respectively, and a stop 326 for the bars 324 and 322. The bar 324 is held for longitudinal sliding movement on the adjacent side wall 64 of the frame 48 by means of spaced screws 84 and 328 which extend through elongated slots 330, respectively, in said bar 324 and are secured to the side wall 64 by nuts 332, respectively. The bar 322 is similarly held for longitudinal sliding movement on the side wall 64 of the frame 48 by spaced screws 334 which extend through elongated slots 336 in said bar 322 and are secured to the side wall 64 by nuts 338, respectively. The stop 326 is in the form of an angle (Fig. 10) which is suitably mounted by a screw 84 on the adjacent side wall 64 of the frame 48. The bars 322 and 324 normally assume the respective lock positions shown in Figs. 10 and 14, in which they arrest the adjacent members 278' and 278 of the lock mechanisms 270 and 272, respectively, against movement into their respective slide-release positions. To this end, the bar 324 is provided with a top flange 340, and both bars 324 and 322 are provided with lateral feet 344 and 346, respectively, which are in part inclined at 348 and 350, respectively, to serve as cams for a purpose hereinafter described. When the bars 322 and 324 are in their respective lock positions (Figs. 10 and 14), the foot 344 of the bar 324 rests against the stop 326, while its top flange 340 is flush with the platform 78, and the foot 346 of the bar 322 rests against the top flange 340 of the bar 324. Thus, with the bars 322 and 324 in their respective lock positions, their respective cam portions 350 and 348 lock the adjacent members 278' and 278 in their respective lock positions, as follows clearly from Fig. 10. In order to permit the locking member 278', for instance, to be shifted from its lock position in Fig. 10 to its release position in Fig. 11, the bar 322 must be permitted to shift into the raised position shown in the latter figure. Similarly, in order to permit the locking member 278 to be shifted into its release position, both bars 324 and 322 must be permitted to rise from their respective lock positions. It follows further from Fig. 11 that the lower bar 324 is arrested in its lock position when the locking member 278' is shifted to its release position, in which it overlies the top flange 340 of said bar 324. Further, the lower locking member 278 may be shifted to its release position only if the upper locking member 278' is in its lock position (Fig. 10), since movement of the member 278 into its release position is possible only if the lower bar 324 is permitted to rise into a position in which it will block movement of the member 278' into its release position.

Provisions are made in the apparatus for normally arresting the bars 322 and 324 in their respective lock positions (Fig. 10). These provisions comprise a lever 360 which is pivotally mounted intermediate its ends, as at 362, on the side wall 64 of the frame 48 (Figs. 13 and 14), and is floatingly pivotally connected at 364 with the upper bar 322. The other end of the lever 360 is pivotally connected at 366 with one end of a link 368, of which the other end is pivotally connected at 370 with a rocker 372. The rocker 372, which is in the form of a plate, is pivotally mounted at 374 on the adjacent front wall 376 of a section 378 of a coin chute (see also Figs. 15 and 16) which forms a part of the coin control mechanism D to be described. A tension spring 380 normally urges the lever 360 into the position shown in Fig. 14, in which the bars 322 and 324 are in their respective lock positions in which they back against the stop 326. The ends of the spring 380 are, in the present instance, anchored to the side wall 64 of the frame 48 and to an angle 386 which is suitably carried by the lever 360. It is now evident, and it appears from Figs. 10, 13 and 14, that the rocker 372 must be permitted to turn clockwise from the home position shown in Fig. 13, in order to permit either one of the locking members 278 or 278' to shift to its release position. However, clockwise rotation of the rocker 372 from the home position in Fig. 13 is prevented by the coin control mechanism D to be described, unless a coin has previously been deposited in the apparatus. On deposition of a coin in the apparatus, the rocker 372 is, through intermediation of the deposited coin, released for turning movement clockwise from its home position in Fig. 13, conditioning thereby all slides B for complete withdrawal of any one of these slides by the customer.

*Coin control mechanism D*

Referring now to Figs. 2, 4, 13 and 17, the coin control mechanism is provided on one side of the frame 48 of the apparatus, and comprises, in the present instance, an upper coin chute 380 which may be welded or otherwise secured to the front leg 384 of a channel-shaped frame 386 (Figs. 4 and 13) which is mounted on the adjacent front flange 388 of the side wall 64 of the frame 48 through intermediation of an angle 390 (Figs. 2 and 4). The coin chute 380 is near its top in open communication with a slot 382 in the leg 384 of the frame 386, and the slot 382 is in alignment with a slot 392 in the front panel 45 of the cabinet 30 (Fig. 1) for insertion by a customer of a coin into the upper chute 380. The coin control mechanism further comprises a coin selector 394 (Figs. 4 and 13) which may be mounted in any suitable manner in the frame 386 beneath the upper coin chute 380. The coin selector 394 may be of any conventional type and, hence, requires neither a detailed illustration of its operating parts, nor a description of the performance of these parts, especially since the coin selector 394 does not form a part of the present invention. For an understanding of the function of the coin selector 394, it is sufficient to state that the same will direct a slug or phoney coin into the wider end 396 of the coin chute section 378 (Figs. 13, 15 and 19), and will direct a genuine coin between guide pieces 398 and 400 in said chute section 378 (Fig. 19). A slug or phoney coin thus discharged by the selector 394 into the wider end 396 of the chute section 378 will pass from there into a chute 402 (Figs. 12 and 13) which leads to the book-discharge chute 250 where the slug or phoney coin may be picked up by the person who inserted it in the apparatus.

The coin chute section 378, which is arranged beneath the coin selector 394, is secured to the frame 386 through intermediation of an angle-shaped extension 404 of the rear plate 406 of said coin chute section 378 (Figs. 2, 12 and 15). Cooperating with the rear plate 406 in forming the chute section 378 is the previously mentioned outer plate or wall 376 (Fig. 15). Secured by screws 407 to the chute-forming plates 376 and 406 are spacers 408 and 409 (Figs. 15, 16 and 19). The coin guide pieces 398 and 400 are interposed between the front and rear plates 376 and 406 of the chute section 378. Secured at 410 to the rocker 372 is an angle bracket 412. The rocker 372 and angle bracket 412 are provided with aligned holes in which is slidably received a pin 414 which, through a slot 416 in the front plate 376 of the chute section 378, projects into the chute portion 418 which, as shown in Fig. 15, is so narrow as to permit the passage therethrough of a coin c in erect disposition only. The pin 414 is normally urged against the rear wall 406 of the chute section 378 by a spring 420 which is interposed between the angle bracket 412 and a collar 422 on said pin 414 (Fig. 15).

Pivoted at 424 on one of the screws 407 is one leg of an L-shaped lever 426 (Fig. 15), of which the other leg 428 projects through a slot 430 in the rear plate 406 of the chute section 378 into the narrow chute portion 418 thereof and extends to the front of said chute section 378 through the slot 416 in the front plate 376 where it is in the path of a shoulder 432 on the rocker 372 in the home position of the latter as shown in Fig. 13. Thus, the leg 428 of the lever 426 normally prevents rotation of the rocker 372 from its home position (Fig. 13) in which it holds the bars 322 and 324 in their respective lock positions (Figs. 10 and 14) through intermediation of the link 368 and lever 360.

A deposited coin c, such as a 25 cent piece, for example, will, on being cleared as genuine by the selector 394, be directed by the latter between the guide pieces 398 and 400 in the chute section 378 which, in turn, will direct the coin onto the spacer 408 into the disposition thereon shown in Fig. 19, i. e. between the pin 414 and the leg 428 of the lever 426. The apparatus is now conditioned for the release of any one of the book-ejector slides B. Thus, on withdrawing any one of the slides B, such as the slide B', for instance, the ensuing lift of the bars 324 and 322 will, through intermediation of the lever 360 and link 368 result in clockwise rotation of the rocker 372 from the home position shown in Fig. 13. Before the shoulder 432 on the rocker 372 would, on such clockwise rotation of the latter, move into engagement with the obstructing leg 428 of the lever 426, the coin c, which is advanced on top of the spacer 408 by the pin 414, will cam the leg 428 of the lever 426 out of the path of the shoulder 432 on the rocker 372 (Figs. 17, 19 and 20), and permit the latter to turn to the full extent (Fig. 18) required for the release of the slide B' selected by the customer. When the rocker 372 nears the end of its rotation (Fig. 18), the pin 414 will, in the course of its final movement into the position shown in Fig. 21, move the coin c over the top 440 of the spacer 408, whereupon the coin will drop by gravity through a chute portion 442 in the chute section 378 and through an aligned slot 446 in the platform 46 into a removable coin collection box or receptacle 450 on the bottom of the cabinet 30.

On complete withdrawal and subsequent return movement of the slide B' by a customer for the ejection of a selected book, the springs 294 and 380 (Figs. 5 and 13) will return the shifted parts of the lock mechanism 272 and of the locking device 273 into their respective lock positions, thereby also returning the rocker 372 to its home position (Fig. 13) in which the same is again locked by the leg 428 of the lever 426 until another coin is deposited in the apparatus, as will be readily understood.

Each of the slides B is near its cam edge 290 provided with notches or ratchet teeth 460 (Figs. 5 and 6) with which is adapted to cooperate a pivoted spring-urged pawl 462. The pawls 462 are alike and mounted similarly on the platforms 76 and 78, respectively, so that a detailed description of one of these pawls and its specific mounting is deemed sufficient. Thus, in the case of the slide B', the pawl 462 is pivoted at 464 on the platform 76 (Fig. 8), and is normally urged by a spring 466 into the position shown in Fig. 5 in which it projects through an opening 467 in the adjacent guide channel 142. In withdrawing the slide B', the same will, on partial withdrawal to the extent shown in Fig. 5, become locked against return movement to its home position by the pawl 462 which will then engage the first one of the notches 460 in the slide B'. Thus, while the slide B' may be withdrawn to some extent and then returned to its home position, the same must, after withdrawal to the extent indicated in Fig. 5, be completely withdrawn before it may be returned to its home position. Hence, a customer, after making his selection of the slide B', for instance, cannot change his or her mind concerning the selection once he or she has withdrawn the slide B' to the extent indicated in Fig. 5.

Each slide B is provided near the rear end thereof with further notches or ratchet teeth 470 (Fig. 6) with which cooperates the coordinated pawl 462 in preventing a customer from manipulating the slide back and forth in its substantially withdrawn condition in an effort, for instance, to bring about the ejection of two books for the purchase price of one book. The rear teeth 470 on each slide B, in conjunction with the associated pawl 462, will further prevent the jamming of books at the discharge end of the associated magazine, which might occur if a customer were permitted to manipulate the slide back and forth when the latter is substantially withdrawn. Thus, a customer, after having once withdrawn a slide B to the extent where the first one of the rear teeth 470 is engaged by the associated pawl 462, must complete the withdrawal of the slide in order to return the slide to its home position and thereby obtain his or her book.

Provisions are also made for the selective return to a customer of a coin which he or she has deposited in the apparatus, so long as no slide B has been withdrawn, or any selected slide has been withdrawn to an extent short of that shown for the slide B' in Fig. 5, in which the associated pawl 462 engages the first one of the front teeth 460 in the slide and prevents return movement of the latter to its home position. These provisions comprise a coin-release bar 480 (Figs. 13 and 17), a rocker 482 and a push button 484. The rocker 482 is, at best shown in Fig. 4, pivoted at 486 to the bottom 488 of the channel-shaped frame 386 and is held spaced therefrom by a spacer 490, while the upper, laterally offset end of the coin-release bar 480 is pivotally connected at 492 with the rocker 482. The push button 484 is axially slidable in aligned holes provided in the front panel 45 of the cabinet 30 (Fig. 1), the front leg 384 of the frame 386, and a bracket 494 on the latter, respectively (see also Fig. 13). The push button is provided with an end collar 496 that is normally urged against the bracket 494 by the rocker 482 which is urged in a counter-clockwise direction as viewed in Fig. 13 by a spring 498, for instance. The coin release bar 480 is intermediate its ends slidable in a slot 500 in an angle bracket 502 (Fig. 4) which may conveniently be mounted at 504 on the coin selector 394 (Fig. 13). The lower, offset end 506 of the coin-release bar 480 is adjacent the collar 422 on the pin 414 when the rocker 372 is in the home position shown in Fig. 13. Hence, depression of the push button 484 by a customer will, under these circumstances, cause the release of a deposited coin by virtue of the retraction of the pin 414 from the narrow chute portion 418 of the chute section 378 by the inclined cam-like length 508 of the coin-release bar 480 which, on its descent from its home position (Figs. 13 and 16) in consequence of the depression of the push button 484, will engage the collar 422 on the pin 414. The coin thus released in consequence of the depression of the push button 484 will descend on the inclined top edge 510 of the spacer 408 (Fig. 19) and pass through the wider end 396 of the chute section 378 and through the chute 402 into the book-discharge chute 259 from which the customer may remove the coin.

The coin-release bar 480 is further so coordinated with the collar 422 on the pin 414 (Fig. 15) that it will, on depression of the push button 484, cooperate with the collar 422 for the retraction of the pin 414 from the narrow chute portion 418 of the chute section 378 even while any of the slides B is partly withdrawn to some extent which is, however, short of the extent to which the slide B' is shown withdrawn in Fig. 5 and locked by the associated pawl 462 against return movement. Thus, after any one of the slides B has been withdrawn to the extent indicated for the slide B' in Fig. 5, the rocker 372 will have been turned sufficiently, clockwise from its home position in Fig. 13, to bring the collar 422 on the pin 414 out of cooperative relation with the coin-release bar 480, so that any attempt by the customer for the return of the deposited coin is at this stage in an operating cycle of the apparatus without avail and he or she has then left no choice but to complete the manipulation of the selected slide for the ejection of the selected book.

The follower 190 and weight W on top of the stack of books in each magazine A is provided with a slidable pin 520 (Fig. 3) which normally rests on the uppermost book of the stack and, after exhaustion of the books in the magazine, drops into a hole 522 in the associated slide and lock the latter against withdrawal, thus rendering the apparatus fool-proof insofar as the dispensation of books in consequence of the deposit of coins in the apparatus is concerned.

While we have shown and described the preferred embodiment of our invention, it will be understood that various changes may be made in the present invention without departing from the underlying idea or principles of the invention within the scope of the appended claims.

Having thus described our invention, what we claim and desire to secure by Letters Patent, is:

1. In article-vending apparatus having groups of side-by-side arranged magazines disposed in superposed rows, respectively, with each magazine adapted to hold a stack of articles, and groups of spaced slides for said magazine rows, respectively, of which each slide has laterally opposite first and second notches and is longitudinally reciprocable from a home position for ejecting an article from its associated magazine, the combination of releasable lock mechanism for all slides, said mechanism comprising rows of lock members for said slide groups, respectively, an end member and the remaining members of each row being mounted on the outside of a first end slide and between successive slides, respectively, of the associated group for movement transversely thereof, and aligning with the notches in the slides of said group when the latter are in their respective home positions, the members of said row having normally engaging extensions for spacing said members of said row so that the latter are, in their mutually engaged relation and in the respective home positions of the associated slides, shiftable as a unit in one direction into first positions, respectively, in which they interlock with the adjacent first notches in all slides, respectively, of said group, and are also shiftable as a unit in the opposite direction into second positions, respectively, in which said remaining members of said row are in interlock with the adjacent second notches in successive slides, respectively, of said group, except the other end slide thereof, and said end member of said row is out of interlock with said first notch in said first end slide of said group, spring means normally urging the members of each row into their respective first positions, cam means on each slide of each group, each cam means being operable, on movement of its slide from home position, to move the adjacent lock member nearest said end member of the associated row into its second position and to lock the other adjacent member in its normal first position, and means operable on movement of said end member of any row into its second position for locking said end member of any other row against movement from its first position, said first notch in each slide being so wide as to permit substantial longitudinal movement of said slide when one of the adjacent lock members is in said first position thereof in interlocking relation therewith, and the opposite notch therein being of smaller width than said first notch and so coordinated with the latter that the other adjacent lock member will, when in said second position thereof in interlocking relation with said opposite notch, permit less longitudinal movement of said slide than is permitted by said one adjacent lock member when in interlocked relation with said first notch.

2. In article-vending apparatus having groups of side-by-side arranged magazines disposed in superposed rows, respectively, with each magazine adapted to hold a stack of articles, and groups of spaced slides for said magazine rows, respectively, of which each slide has laterally opposite first and second notches and is longitudinally reciprocable from a home position for ejecting an article from its associated magazine, the combination of releasable lock mechanism for all slides, said mechanism comprising rows of lock members for said slide groups, respectively, an end member and the remaining members of each row being mounted on the outside of a first end slide and between successive slides, respectively, of the associated group for movement transversely thereof, and aligning with the notches in the slides of said group when the latter are in their respective home positions, the members of said row having normally engaging extensions for spacing said members of said row so that the latter are, in their mutually engaged relation and in the respective home positions of the associated slides, shiftable as a unit in one direction into first positions, respectively, in which they interlock with the adjacent first notches in all slides, respectively, of said group, and are also shiftable as a unit in the opposite direction into second positions, respectively, in which said remaining members of said row are in interlock with the adjacent second notches in successive slides, respectively, of said group, except the other end slide thereof, and said end member of said row is out of interlock with said first notch in said first end slide of said group, spring means normally urging the members of each row into their respective first positions, cam means on each slide of each group, each cam means being operable, on movement of its slide from home position, to move the adjacent lock member nearest said end member of the associated row into its second position and to lock the other adjacent member in its normal first position, and means operable on movement of said end member of any row into its second position for locking said end member of any other row against movement from its first position, said cam means on each slide being formed by first and second oppositely inclined end walls of said first and second notches therein, respectively, and the rearwardly continuing side walls, respectively, of said slide, and said first end wall of said first notch being on said slide rearwardly offset from said second end wall of said second notch, thereby permitting substantial longitudinal movement of said slide from its home position when an adjacent member is in interlock with said first notch therein, and permitting less longitudinal movement of said slide when the other adjacent member is in interlock with said second notch therein.

3. In article-vending apparatus having groups of side-by-side arranged magazines disposed in superposed rows, respectively, with each magazine adapted to hold a stack of articles, and groups of spaced slides for said magazine rows, respectively, of which each slide has laterally opposite first and second notches and is longitudinally reciprocable from a home position for ejecting an article from its associated magazine, the combination of releasable lock mechanism for all slides, said mechanism comprising rows of lock members for said slide groups, respectively, an end member and the remaining members of each row being mounted on the outside of a first end slide and between successive slides, respectively, of the associated group for movement transversely thereof, and aligning with the notches in the slides of said group when the latter are in their respective home positions, the members of said row having normally engaging extensions for spacing said members of said row so that the latter are, in their mutually engaged relation and in the respective home positions of the associated slides, shiftable as a unit in one direction into first positions, respectively, in which they interlock with the adjacent first notches in all slides, respectively, of said group, and are also shiftable as a unit in the opposite direction into second positions, respectively, in which said remaining members of said row are in interlock with the adjacent second notches in successive slides, respectively, of said group, except the other end slide thereof, and said end member of said row is out of interlock with said first notch in said first end slide of said group, spring means normally urging the members of each row into their respective first positions, cam means on each slide of each group, each cam means being operable, on movement of its slide from home position, to move the adjacent lock member nearest said end member of the associated row into its second position and to lock the other adjacent member in its normal first position, and means operable on movement of said end member of any row into its second position for locking said end member of any other row against movement from its first position, said first notch in each slide being so wide as to permit substantial longitudinal movement of said slide when one of the adjacent lock members is in said first position thereof in interlocking relation therewith, and the opposite notch therein being of smaller width than said first notch and so coordinated with the latter that the other adjacent lock member will, when in said second position thereof in interlocking relation with said opposite notch, permit less longitudinal movement of said slide than is permitted by said one adjacent lock member when in interlocked relation with said first notch, said last mentioned means comprising a stop and longitudinally aligned bars extending transversely of said member rows and being normally urged into first positions, respectively, in which they are in end-to-end engagement with each other and with said stop adjacent said end members, respectively, the ends of said bars nearest said stop being cam-shaped feet, respectively, which in the respective first positions of said bars lock the adjacent end members, respectively, in their respective first positions, and any one of said end members will, on its movement into said second position, enter between the ends of the adjacent bars, whereby any bar between said one end member and stop will be locked in its first position and any other bar will, by virtue of the cooperation between said one end member and the adjacent cam foot of one of said adjacent bars, be shifted into a second position in which its end remote from said stop will lock the adjacent end member in its first position.

References Cited in the file of this patent

UNITED STATES PATENTS

| Number | Name | Date |
|---|---|---|
| 480,208 | Nichols | Aug. 2, 1892 |
| 2,156,531 | Geer | May 2, 1939 |
| 2,283,252 | Hartman | May 19, 1942 |
| 2,310,072 | Fry | Feb. 2, 1943 |
| 2,380,093 | Wilder | July 10, 1945 |
| 2,546,690 | Gabrielsen | Mar. 27, 1951 |

FOREIGN PATENTS

| Number | Country | Date |
|---|---|---|
| 330,276 | Great Britain | May 28, 1930 |
| 457,990 | Great Britain | Dec. 10, 1936 |